(12) United States Patent
Nagata et al.

(10) Patent No.: US 6,284,355 B1
(45) Date of Patent: Sep. 4, 2001

(54) FILM, LAMINATED FILM AND LAMINATED STRUCTURE

(75) Inventors: Makoto Nagata; Koichi Yanase, both of Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/312,707

(22) Filed: May 17, 1999

(30) Foreign Application Priority Data

May 20, 1998 (JP) .................................................. 10-138414
Aug. 31, 1998 (JP) .................................................. 10-245232

(51) Int. Cl.$^7$ .................................................. B32B 27/32
(52) U.S. Cl. .......................................... 428/213; 428/516
(58) Field of Search .................................. 428/515, 516, 428/523, 213; 526/351, 248

(56) References Cited

U.S. PATENT DOCUMENTS 5,118,566 * 6/1992 Wilhelm et al. ..................... 428/339

FOREIGN PATENT DOCUMENTS

| 0266109-A2 | 5/1988 | (EP) . |
| 0285071-A2 | 10/1988 | (EP) . |
| 0644032-A2 | 3/1995 | (EP) . |
| 0763560-A1 | 3/1997 | (EP) . |
| 50-19132B | 7/1975 | (JP) . |
| 51-097658A | 8/1976 | (JP) . |
| 58-215333 | 12/1983 | (JP) . |
| 3-50156 | 6/1991 | (JP) . |
| 4-135716 | 5/1992 | (JP) . |
| 4-33709 | 5/1992 | (JP) . |
| 4-268313 | 9/1992 | (JP) . |
| 8-267500 | 10/1996 | (JP) . |
| 8-267688 | 10/1996 | (JP) . |
| 8-267692 | 10/1996 | (JP) . |
| 8-276544 | 10/1996 | (JP) . |
| 9-141788 | 6/1997 | (JP) . |
| 9-141790 | 6/1997 | (JP) . |
| 9-41789 | 6/1997 | (JP) . |
| 9-50487 | 6/1997 | (JP) . |
| 9-193189 | 7/1997 | (JP) . |
| 9-93237 | 7/1997 | (JP) . |
| 9-234836 | 9/1997 | (JP) . |
| 10-156873 | 6/1998 | (JP) . |

* cited by examiner

*Primary Examiner*—Paul Thibodeau
*Assistant Examiner*—D. Lawrence Tarazano
(74) *Attorney, Agent, or Firm*—Birch, Stewart, Kolasch & Birch, L.L.P.

(57) ABSTRACT

There are provided:
  a film(F) obtained by heat-aging a film containing a specific propylene resin;
  a laminated film(LF-1) having (i)a layer containing a specific propylene resin, and (ii)a layer containing a specific propylene block copolymer;
  a laminated film(LF-2) obtained by heat-aging the laminated film(LF-1);
  a laminated structure(LS-1) having (a)a substrate containing an olefinic resin, and (b)the film(F);
  a laminated structure(LS-2) having (a)a substrate containing an olefinic resin, and (b)the laminated film(LF-1);
  a laminated structure(LS-3) obtained by heat-aging said laminated structure(LS-2);
  a laminated structure(LS-4) having (a)a substrate containing an olefinic resin, and (b)a laminated film(LF-2); and
  a laminated structure(LS-5) having (a)a substrate containing an olefinic resin, and (b)a film containing a specific propylene resin.

12 Claims, 1 Drawing Sheet

FILM, LAMINATED FILM AND LAMINATED STRUCTURE

FIELD OF THE INVENTION

The present invention relates to a film superior in its appearances and scratch resistance, a laminated film superior in its appearances, scratch resistance and impact resistance, and a laminated structure comprising a substrate and the film or the laminated film, wherein the substrate and the film or the laminated film are laminated together.

BACKGROUND OF THE INVENTION

As a technique for improving appearances and scratch resistance of products made of thermoplastic resins, there are known a laminated film formed by laminating a film made of thermoplastic resins with a film superior in its appearances and scratch resistance, and a laminated structure formed by laminating a substrate made of thermoplastic resins with a film superior in its appearances and scratch resistance.

With respect to the former, i.e. the laminated film, there is proposed a three-layer laminated film composed of an olefinic resin-made film, a hard acrylic resin-made film superior in its transparency and scratch resistance and an adhesive resin interposed between both films to bond them, wherein the adhesive resin is, for example, a halogen- or acid anhydride group-carrying olefinic resin, as disclosed in, for example, JPA-9-193189, JP-A-9-234836, JP-B-6-26718 and JP-B-8-2550.

With respect to the latter, i.e. the laminated structure, there is known a laminated structure obtained by injecting an olefinic resin to be molded into a substrate on an olefinic resin-made film situated so as to attach closely to an inner wall of an injection molding mold, thereby performing simultaneously both a molding of the substrate and adhesion between the substrate and the film as disclosed in, for example, JP-B-50-19132.

Each of the references referred to above is incorporated herein by reference in its entirety.

However, the former laminated film has problems such that (1) its impact resistance is lower than that of the olefinic resin made-film per se, because an acrylic resin is used, which is harder and more fragile than the olefinic resin, (2) its thickness is unduly large and its production cost is too high, because the adhesive resin has to be interposed between the acrylic resin-made film and the olefinic resin-made film, and (3) the laminated film can hardly be recycled as it is, because the acrylic resin-made film and the olefinic resin-made film are different materials in kind.

The latter laminated structure also has a problem such that the scratch resistance thereof is not satisfactory, because the olefinic resin-made film used is low in its scratch resistance.

SUMMARY OF THE INVENTION

An object of the present invention is to provide a film that is superior in its appearances and scratch resistance.

Another object of the present invention is to provide a laminated film that is superior in its appearances, scratch resistance, impact resistance and recyclablility, and free from an unduly thick thickness and that is low in its production cost.

A further object of the present invention is to provide a laminated structure that is superior in its appearances, scratch resistance, impact resistance and recyclability, which comprises a substrate and a film or a laminated film, which are laminated together in said laminated structure.

The present inventors have undertaken extensive studies to accomplish their objects, and, as a result, have found that the desired film, laminated film and laminated structure can be obtained by using a specific propylene based resin and a specific propylene based block copolymer, and thereby the present invention has been obtained.

Firstly, the present invention provides a film(F) obtained by heat-aging a film having a haze value of not higher than about 10%, which film(F) contains a propylene based resin having a modulus of elasticity in bending at 23° C. of from about 1300 to 2800 MPa.

Secondly, the present invention provides a laminated film(LF-1) comprising:
 (i) a layer containing a propylene based resin having a modulus of elasticity in bending at 23° C. of from about 1300 to 2800 Mpa; and
 (ii) a layer containing a propylene based block copolymer; wherein the propylene based block copolymer is prepared by a process comprising the steps of:
  (I) carrying out copolymerization of propylene with ethylene until a content of a component(A) which is a propylene-ethylene copolymer component having a content of a repeating unit derived from ethylene of from about 1.5 to 6.0% by weight reaches from about 40 to 85% by weight based on the total weight of the component(A) and a below-defined component(B), and
  (II) carrying out copolymerization of propylene with ethylene in the presence of the component(A) prepared in step (I) until a content of the component(B), which is a propylene-ethylene copolymer component having a content of a repeating unit derived from ethylene of from about 7 to 17% by weight, reaches from about 15 to 60% by weight based on the total weight of the components (A) and (B);
 provided that an intrinsic viscosity, $[\eta]B$, of the component(B) is from about 2 to 5 dl/g, and a ratio of $[\eta]B$ to an intrinsic viscosity, $[\eta]A$, of the component (A), $[\eta]A$, is from about 0.5 to 1.8; and
 provided that said propylene based resin excludes a propylene based block copolymer which has a modulus of elasticity in bending at 23° C. of not lower than about 1300 Mpa.

Thirdly, the present invention provides a laminated film (LF-2) obtained by heat-aging the above-defined laminated film(LF-1).

Fourthly, the present invention provides a laminated structure(LS-1) comprising:
 (a) a substrate containing an olefinic resin; and
 (b) the above-defined film(F); wherein the substrate and the film(F) are laminated together.

Fifthly, the present invention provides a laminated structure(LS-2) comprising:
 (a) a substrate containing an olefinic resin; and
 (b) the above-defined laminated film(LF-1); wherein the substrate and the laminated film(LF-1) are laminated together, so that the film(LF-1) layer containing the propylene based block copolymer contacts a surface of the substrate.

Sixthly, the present invention provides a laminated structure(LS-3) obtained by heat-aging the above-defined laminated structure(LS-2).

Seventhly, the present invention provides a laminated structure(LS-4) comprising:

(a) a substrate containing an olefinic resin; and (b) a laminated film obtained by heat-aging the above-defined laminated film(LF-1);

wherein the substrate and the laminated film are laminated together.

Eighthly, the present invention provides a laminated structure(LS-5) comprising:

(a) a substrate containing an olefinic resin; and (b) a film having a haze value of not higher than about 10%, which film contains a propylene based resin having a modulus of elasticity in bending at 23° C. of from about 1300 to 2800 Mpa;

wherein the substrate and the film are laminated together.

Lastly, the present invention provides an interior or exterior car part or a casing part of an electric or OA(office automation) appliance comprising the above-defined laminated structure LS-1, LS-2, LS-3, LS-4 or LS-5.

In the specification of the present invention, the "film" includes a sheet as well as a film, and the "appearances" are understood as meaning, in particularly, glossiness and deep appearance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

In FIG. 1, reference numeral 1 denotes a gate, reference numeral 2 denotes a position, at which pencil hardness and low temperature impact property are measured, reference numeral 3 denotes a laminated film, reference numeral 4 denotes a substrate, and reference numeral 5 denotes a position, at which an adhesion strength is measured.

DETAILED DESCRIPTION OF THE INVENTION

Figure 1:
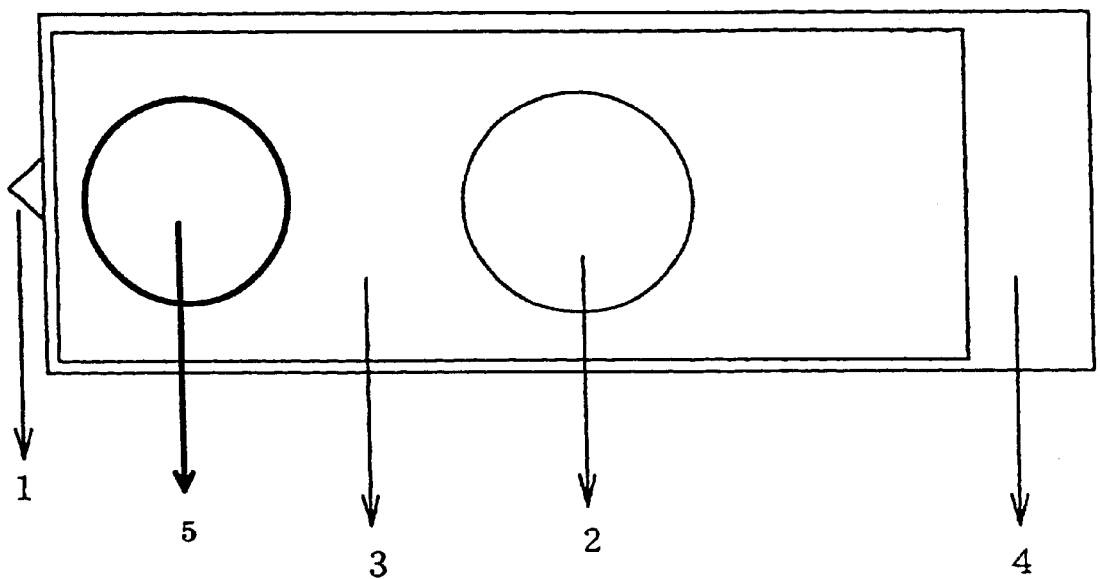
FIG. 1, which is given by way of illustration only, and thus is not limitative of the present invention, shows a plane view of one embodiment of the laminated structure in accordance with the present invention.

With respect to the propylene based resin used in the present invention, its modulus of elasticity in bending at 23° C. is from about 1300 to 2800Mpa, preferably from about 1500 to 2500 MPa, more preferably from about 1600 to 2300. There is no additional limitation to the resin used as far as the resin is capable of being formed into a film by any known molding method such as a conventional extrusion molding method.

When the modulus of elasticity is less than about 1300 Mpa, the surface of the film, laminated film or laminated structure of the present invention is insufficient in its scratch resistance. Whereas, when the modulus of elasticity exceeds about 2800 Mpa, the layer containing such a propylene based resin has the effect of deteriorating the impact resistance of the other layer(s) and the other part(s), which are constituents of the laminated film and laminated structure of the present invention, respectively. Herein, the other layer(s) and the other part(s) are understood as meaning the remaining layer(s) and part(s) when such a propylene based resin layer is removed from the laminated film and the laminated structure, respectively.

The propylene based resin contains a homopolymer of propylene, a copolymer of a predominant amount of propylene with ethylene, an α-olefin having 4 or more carbon atoms or any other monomer, or a mixture of the (co) polymers.

Examples of the copolymer area propylene-ethylene random copolymer and a propylene-α-olefin random copolymer. Contents of ethylene or the α-olefin are usually from about 1 to 10% by weight, respectively Preferred examples of the α-olefin are those having 4 to 10 carbon atoms, such as butene-1, pentene-1, hexene-1 and octene-1.

Among these propylene based resins, one containing a homopolymer of propylene is preferred.

For improving scratch resistance of the surface of the film in accordance with the present invention, the propylene based resin preferably is utilized in combination with a petroleum resin. More specifically, they are preferably used in combination in a ratio of from about 97 to 60% by weight of the propylene based resin to about 3 to 40% by weight of the petroleum resin.

For improving the modulus of elasticity and transparency, the propylene based resin may also be used in combination with any known nucleating agent such as phosphoric esters in an amount of about 0.5% by weight or less, based on the weight of the propylene based resin, or lustrous particles such as mica covered with aluminum or titanium oxide, or a pigment in an effective amount in each case. If desired, the propylene based resin may further be utilized in combination with conventional additives such as lubricants, anti-oxidants, ultraviolet ray absorbents and flame retarders in each suitable amount.

A thickness of the film containing the propylene based resin, which is to be heat-aged, is not particularly limited, except that a haze value of the film is not higher than about 10%. A film having a haze value exceeding about 10% is not favorable, because its transparency is poor, so that a printed surface, if any, can not be recognized clearly, when the film is observed from a side opposite to the printed surface.

In the present invention, the surfaces of respective layers constituting the laminated film or the surfaces of respective films constituting the laminated structure are preferably subjected to surface oxidation treatment such as corona discharge treatment, thereby improving the adhesion strength. In the above, the surfaces are understood as meaning those to be touched with the surface of the other layer or the substrate. The surface oxidation treatment can be carried out within the production processes of the respective layers or the films, i.e. in an inline manner, or after the production of them, i e. in an offline manner. A wetting degree of the oxidation-treated surfaces is preferably about 30 dyne/cm or more, more preferably about 40 dyne/cm or more.

When the surfaces of respective layers or films are desired to be printed, it is preferred to carry out the printing after completion of the surface oxidation treatment. The printing on the oxidation-treated surfaces can be carried out in a conventional manner such as offset printing or gravure. Printing inks used are preferably inert to the above-mentioned adhesion, and examples thereof are acrylic inks, urethane inks and imide inks.

The heat-aging treatment in the present invention is carried out to improve the surface scratch resistance of the film. The manner of the heat-aging treatment is not particularly limited, and the treatment can be carried out, for example, by heating the film in an atmosphere of preferably from about 70 to 100° C. for a period of from one hour to one day by a known means. The film can be subjected to heat-aging treatment between a cooling step and a winding step in the production process of the film (inline treatment). Alternatively, the film wound may be subjected to heat-aging treatment at a zone independent of the film production zone (off line treatment). When the film of the present invention is desired to have a printed surface, the film printed may be subjected to heat-aging treatment, or the film heat-aged may be subjected to printing.

The propylene based block copolymer in relation to the laminated film and the laminated structure in accordance with the present invention is a polymer obtained by carrying out Step(II) in the presence of the copolymer obtained in Step(I) to produce a copolymer additionally. In the specification of the present invention, such a polymer is expressed by a term, "a block copolymer". However, the polymer concerned is a kind of polymer blend rather than a typical block copolymer wherein an end of one polymer is bonded to an end of another polymer. Incidentally, such a term is generally used by those of ordinary skill in the art for a high impact propylene based copolymer obtainable through the steps as mentioned above.

With respect to a proportion of the component(A) obtained in Step(I) and the component(B) obtained in Step (II), the component(A) is from about 40 to 85% by weight, preferably from about 45 to 60% by weight, and the component(B) is from about 15 to 60% by weight, preferably from about 40 to 55% by weight. When the component (A) exceeds about 85% by weight, in other words, the component(B) is less than about 15% by weight, impact resistance of the propylene based block copolymer obtained is insufficient. Whereas, when the component(A) is less than about 40% by weight, in other words, the component(B) exceeds about 60% by weight, heat resistance of the propylene based block copolymer obtained is insufficient.

The content of a repeating unit derived from ethylene (hereinafter, the repeating unit is abbreviated as "ethylene unit") in the component(A) obtained through Step(I) is within a range of from about 1.5 to 6.0% by weight. When the ethylene unit content in the composition(A) is less than about 1.5% by weight, flexibility of the propylene based block copolymer obtained lowers, and when it exceeds about 6.0% by weight, the heat resistance thereof lowers. From a viewpoint of balanced flexibility and heat resistance, the ethylene unit content in the component(A) is preferably from about 2.5 to 4.5% by weight.

The content of the ethylene unit in the component(B) obtained through Step(II) is within a range of from about 7 to 17% by weight. When the ethylene unit content is less than about 7% by weight, a low temperature impact resistance of the propylene based block copolymer obtained lowers, and when it exceeds about 17% by weight, its transparency lowers. From a viewpoint of improving the low temperature impact resistance of the propylene based block copolymer obtained, the ethylene unit content in the component(B) is preferably from about 10 to 17% by weight.

From a viewpoint of transparency of the propylene based block copolymer obtained, an intrinsic viscosity, $[\eta]B$, of the component(B) is from about 2 to 5 dl/g, and a ratio of the intrinsic viscosity of the component(B) to an intrinsic viscosity, $[\eta]A$, of the component(A), namely, $[\eta]B/[\eta]A$ is from about 0.5 to 1.8.

When $[\eta]B$ is less than about 2 dl/g, the content of lower molecular weight components in the propylene based block copolymer obtained increases, and when it exceeds about 5 dl/g, flowability of the propylene based block copolymer obtained lowers to result in deterioration of processability. From a balanced viewpoint of controlling the lower molecular weight components in the propylene based block copolymer obtained and the processabity thereof, $[\eta]B$ is preferably from about 2.5 to 4.0 dl/g.

When the ratio, $[\eta]B/[\eta]A$, exceeds about 1.8 or it is less than about 0.5, a compatibility of the component(A) with the component(B) lowers, so that the transparency of the propylene based block copolymer obtained is deteriorated. Particularly preferred $[\eta]B/[\eta]A$ is from about 0.8 to 1.5 from a viewpoint of the transparency.

From a viewpoint of controlling a component extractive with a solvent such as n-hexane, it is preferred to use a propylene based block copolymer of about 6% by weight or less in a content of a component having a molecular weight of about 26,000 or less in a 20° C. xylene-soluble portion The difference between the ethylene unit content(EB) of the component(B) contained in the propylene based block copolymer and the ethylene unit content (EA) of the component(A) contained therein, namely (EB)–(EA), is preferably from about 3 to 15% by weight, more preferably from about 5 to 12% by weight from a viewpoint of the transparency and the low temperature impact resistance of the copolymer.

The propylene based block copolymer can be produced using, for example, a Ziegler-Natta catalyst in a batchwise manner, wherein the component(A) is first produced in a polymerization vessel, and successively the component(B) is produced in that polymerization vessel, or in a continuous manner, wherein the component(A) and the component(B) are independently of each other produced continuously using at least two polymerization vessels, as disclosed in JP-A-9-324022, which reference is incorporated herein by reference in its entirety A specific embodiment of the production process is given as follows.

In Step (I), propylene, ethylene and hydrogen (a molecular weight controller) are fed in a vapor phase polymerization vessel substantially in the absence of an inert solvent, and polymerization is carried out to obtain the component (A) under conditions of a temperature of from about 20 to 150° C., preferably from about 50 to 95° C., and a pressure of from atmospheric pressure to about 40 kg/cm$^2$G, preferably from about 2 to 40 kg/cm$^2$G using a Ziegler-Natta catalyst having at least titanium, magnesium and a halogen as essential components, which is composed of (a1), (b1) and (c1) or (a2) and (b2) as mentioned below, and successively in Step(II), propylene, ethylene and hydrogen are fed in that vapor phase polymerization vessel, and polymerization is carried out in the presence of the component(A) to produce the component(B), whereby the desired propylene based block copolymer can be obtained.

(a1) A trivalent titanium compound-containing solid catalyst component obtained by reducing a titanium compound represented by the formula, Ti(OR$^1$)$^n$X$_{4-n}$, wherein R$^1$ is a hydrocarbon group having 1 to 20 carbon atoms, X is a halogen atom, and n is a number satisfying 0<n≦4, with an organomagnesium compound in the presence of an Si—O bond-carrying organosilicon compound to obtain a solid product, and then treating the obtained solid product with an ester compound and a mixture of an ether compound with titanium tetrachloride.

(b1) An organoaluminum compound (c1) An Si—OR$^2$ bond-carrying silicon compound, R$^2$ being a hydrocarbon group having 1 to 20 carbon atoms.

(a2) A hydrocarbyloxy group-carrying solid catalyst component obtained by reducing a titanium compound represented by the formula, $Ti(OR^1)_nX_{n-4}$, wherein $R^1$ is a hydrocarbon group having 1 to 20 carbon atoms, X is a halogen atom, and n is a number satisfying $0<n\leq4$, with an organoaluminum compound represented by the formula, $AlR^2_mY_{3-m}$, wherein $R^2$ is a hydrocarbon group having 1 to 20 carbon atoms, Y is a halogen atom and m is a number satisfying $1\leq m\leq3$, to obtain a hydrocarbon solvent insoluble solid product having a hydrocarbyloxy group, subjecting the solid product to prepolymerization with ethylene and then treating the resulting product in the presence of an ether compound and titanium tetrachloride at about 80 to 100° C. in a slurry state in a hydrocarbon solvent.

(b2) An organoaluminum compound

The components (a1),(b1) and (c1), and (a2) and (b2) are used in a proportion such that a molar ratio of Al atom in (b1) or (b2) to Ti atom in (a1) or (a2) is from about 1 to 2000, preferably from about 5 to 1500, and a molar ratio of Si atom in (c1) to Al atom in (b1) is from about 0.02 to 500, preferably from about 0.05 to 50.

The propylene based block copolymer may be melt-kneaded in the presence or absence of an organic peroxide in a conventional manner, so that its flowability which can be expressed, for example, in terms of a melt flow rate, can be varied. For example, a mixture obtained by mixing the block copolymer with an organic peroxide such as 2,5-dimethyl-2,5-di-t-butyl peroxyhexane using a Henschell mixer is melt-kneaded at 250° C., whereby the flowability of the block copolymer can be regulated appropriately. Further, if desired, the propylene based block copolymer may be used in combination with lubricants, anti-oxidants, ultraviolet ray absorbers, antistatic agents, anti-fogging agents, nucleating agents and others.

The laminated film of the present invention, which comprises a layer containing the propylene based resin and a layer containing the propylene based block copolymer, can be obtained by any known laminated film-production method such as co-extrusion molding method. For example, the propylene based resin and the propylene based block copolymer are co-extruded in a manner such that the respective layers thereof contact each other, thereby obtaining the desired laminated film.

Although a thickness of the laminated film of the present invention is not particularly limited, it is preferably from about 60 to 500 μm, more preferably from about 100 to 350μm, provided that a thickness of the propylene based resin layer is preferably from about 50 to 400 μm, more preferably from about 60 to 300 μm.

The laminated film of the present invention may further comprise an additional layer containing an olefinic resin, which is situated so as to attach to the surface of the propylene based block copolymer opposite to that attached to the propylene based resin layer, provided that the thickness of such a laminated film is within a range as defined above. In this connection, the thickness of the propylene based resin layer is preferably within a range as defined above.

In the case where the propylene based resin layer or the propylene based block copolymer layer constituting the laminated film of the present invention comprises a pigment, particularly in order to improve clearness of the pigment and the deep appearance of the laminated film, the propylene based resin layer is desired to have a haze value of not higher than 10%. Besides the pigment, lustrous particles such as mica covered with aluminum powder or titanium oxide may be added thereto in a suitable amount Furthermore, the back side of the laminated film obtained may be subjected to surface oxidation treatment such as corona discharge treatment, and thereafter subjected to printing.

In the present invention, it is preferred to apply the heat-aging treatment for the laminated film, like in the film of the present invention, whereby the surface scratch resistance of the propylene based resin layer constituting the present laminated film can be improved.

In the laminated structure in accordance with the present invention, the film or the laminated film constituting the present laminated structure melt-adheres to the olefinic resin substrate. When the laminated film is used for the laminated structure, the propylene based block copolymer layer constituting the laminated film melt-adheres to the substrate, and when the film or the laminated film has a printed surface, the printed surface melt-adheres to the substrate.

The olefinic resin includes, for example, a homopolymer of an α-olefin such as ethylene and propylene, a copolymer of α-olefins, a copolymer of an α-olefin with any other monomer, and a mixture of the (co)polymers, which are capable of being formed into a molded product by any known molding method, such as extrusion molding, injection molding and blow molding methods.

Specific examples of the olefinic resin are ethylene based resins such as a homopolymer of ethylene and a copolymer of ethylene with any other monomer, provided that the copolymer has a repeating unit derived from ethylene as the main repeating unit; propylene based resins such as a homopolymer of propylene and a copolymer of propylene with any other monomer, provided that the copolymer has a repeating unit derived from propylene as the main repeating unit; polybutene; poly-4-methylpentene-1; a copolymer of at least two monomers selected from ethylene and α-olefins having 3 or more carbon atoms; and a mixtures of the above described resins and copolymers. Specific examples of the α-olefin having 3 or more carbon atoms are propylene, butene-1, pentene-1, hexene-1, octene-1, decene-1 and octadecene-1.

Examples of the copolymer of at least two monomers selected from ethylene and α-olefins having 3 or more carbon atoms described above are a propylene-ethylene block copolymer and a propylene-ethylene-butene-1 block copolymer of these olefinic resins, preferred are the propylene based resin and the propylene-ethylene block copolymer, and more preferred is the propylene-ethylene block copolymer.

The olefinic resin can be prepared by a conventional method, and a solid catalyst and a metallocene type homogeneous catalyst are exemplified as the polymerization catalyst used therefor.

Depending on the intended use of the laminated structure, the olefinic resin may be used in combination with inorganic fillers such as talc in an amount of about 5 to 40% by weight, for example, in order to increase the mechanical strength of the laminated structure or to decrease the mold shrinkage thereof. Further, the olefinic resin may contain lustrous particles such as mica covered with aluminum or titanium oxide in a suitable amount. Furthermore, depending on intended use thereof, the olefinic resin may contain various additives usually used , such as, for example, styrenic elastomers, antioxidants, ultraviolet ray absorbers, flame retardants and coloring agents.

When the laminated structure in accordance with the present invention is used in the field where a high impact strength is particularly needed, it is preferred to use the olefinic resin substrate showing ductile fracture when a sample of 3 mm in a thickness is subjected to an equal punching test at a speed of 3 m/sec and a temperature of −10° C.

The laminated structure in accordance with present invention can be produced by injecting the olefinic resin to be molded into the substrate onto the film or the laminated film of the present invention, thereby performing the molding of the substrate and melt-adhesion (adhesive integration) between the substrate and the film or the laminated film simultaneously.

For example, it can be performed by using an injection molding machine provided with an in-moldable mold in a manner such that the film or the laminated film of the present invention is placed so as to attach closely to an inner surface of a cavity of an injection molding mold provided with a forwarding means of the film or the laminated film, a heating means of the film or the laminated film and a suction means (for example, a vacuum pump), and thereafter the olefinic resin is subjected to injection molding. Further, it can be performed also in a manner such that the film or the laminated film of the present invention is molded so as to fit a shape of the injection mold by using a vacuum molding machine, the film vacuum-molded or the laminated film vacuum-molded is then placed closely to an inner surface of a cavity of an injection mold, and thereafter the olefinic resin is subjected to injection molding. These methods for the production of the laminated structure can perform simultaneously both the molding and adhesion of the substrate according to the injection molding method.

When the laminated structure is produced by laminating the substrate with the laminated film comprising the propylene based resin layer and the propylene based block copolymer layer, it is preferred to apply a heat-aging treatment to the laminated film, like in the film of the present invention, thereby improving the surface scratch resistance of the propylene based resin layer.

The heat-aging treatment to be carried out for improving the scratch resistance of the propylene based resin film layer which is a constituent of the laminated structure of the present invention can be conducted in various manners including those described below;

- a manner of heat-aging the propylene based resin film in advance (before the lamination with the substrate),
- a manner of heat-aging the laminated film in advance (before the lamination with the substrate),
- a manner of heat-aging the laminated structure obtained by laminating the substrate with the propylene based resin film which is not yet subjected to heat-aging treatment, and
- a manner of heat-aging the laminated structure obtained by laminating the substrate with the laminated film which is not yet subjected to heat-aging treatment.

With respect to the laminated structure comprising the olefinic resin substrate and the propylene based resin film, which are laminated together, preferred is a laminated structure having a 2B or more pencil hardness at a surface of the film.

With respect to the laminated structure comprising the olefinic resin substrate and the laminated film, which are laminated together, preferred is a laminated structure having a 4B or more a pencil hardness at a surface of the laminated film, and being at least equal(equal or superior) in low temperature impact resistance to a structure made of the olefinic resin having the same shape as that of the present laminated structure, in other words, low temperature impact resistance of the substrate per se.

In the present invention, the laminated structure comprising the propylene based resin film and the olefinic resin substrate that are laminated together is preferably subjected to heat-aging treatment, like in the film of the present invention, thereby improving the surface scratch resistance of the propylene based resin layer.

In addition, the laminated structure comprising the propylene based resin film printed at one side surface and the olefinic resin substrate that are laminated together is preferably subjected to heat-aging treatment, like in the film of the present invention, thereby improving the surface scratch resistance of the propylene based resin layer.

In accordance with the present invention, there can be provided a film superior in its appearances and scratch resistance, and a laminated film superior in its appearances, scratch resistance, impact resistance and recyclability, and that is free from an unduly thick thickness and that is low in a production cost, the film and the laminated film being suitably used for the production of a laminated structure. Further, in accordance with the present invention, there can be provided a structure laminated with the film or the laminated film, which is superior in its appearances, scratch resistance, impact resistance and recyclability, and that is suitably used for the production of interior or exterior car parts such as a bumper, side trim, console box and center cluster, and casing parts for electric or OA appliances.

The present invention is illustrated in more detail with reference to the following Examples, which are only illustrative, and are not limitative for the scope of the present invention.

The injection molding machine, the mold, the shape of the molded product and the evaluation methods used in Examples were as follows.

1. Injection Molding Machine and Mold

Injection molding machine: FS160S25ASEN manufactured by
   Nissei Plastic Industrial Co., Ltd.
   Molding temperature : 225° C.
   Mold: 150 mm×300 mm×3 mm (thickness), fan gate
   Mold temperature: 37° C. (cavity side, namely the side at which the laminated film was fixed), 44° C. (core side)

2. Melt Flow Rate

Measured by the method prescribed in JIS-K-7210, Condition 14.

3. Proportion of Component(A), (PA), and Component(B), (PB), in the Propylene Based Block Copolymer (% by weight)

Calculated on the basis of material balance in the production processes of the components(A) and the component (B), respectively.

4. Intrinsic Viscosity, [η], of Propylene Based Block Copolymer

Measured in tetralin at 135° C. using Ubbelohde's viscometer.

5. Intrinsic Viscosity of Component(A), [η]A, and That of Component(B), [η]B

The [η]A was measured by the method mentioned in the above item 4 after completion of the production process of the component(A), i.e. Step(I), and [η]B was calculated by the following equation, $$[\eta]B=([\eta]AB-[\eta]A \times PA/100) \times 100/PB$$

wherein the [η]A, PA and PB are as mentioned above and the [η]AB is an intrinsic viscosity measured by the method mentioned in the above item 4 after completion of the production process of the component(B), i.e. Step(II).

6. Ethylene Unit Content in Component(A), EA, and That in Component(B), EB

The EA was measured after completion of Step(I) by a $^{13}$C-NMR method disclosed in page 616 of "KOBUNSHI HANDOBUKKU (High Molecular Hand Book)" issued by KINOKUNIYA SYOTEN (Book store) in 1995, and the EB was calculated by the following equation, $$EB=(EAB-EA\times PA/100)\times 100/PB$$

wherein the EA, PA and PB are as mentioned above, and the EAB is a value measured after completion of Step(II) by the $^{13}$C-NMR method mentioned above.

7. Modulus of Elasticity in Bending

Measured at a test speed of 1 mm/min., 23° C., 50% RH and 50 mm in a distance between fulcrums by the method prescribed in JIS-K-7203.

8. Pencil Hardness

The test was carried out in relation to the surface of the laminated structure (the surface at the laminated film side) according to the pencil scratch test prescribed in JIS-K-5400. In evaluating, the test was started with use of a pencil of 6B in hardness, and continued with use of those of 5B, 4B and others higher in hardness in order, thereby determining the pencil which first scratched the surface of the laminated structure, and the hardness of the laminated structure was expressed in terms of the hardness of the pencil which first scratched the surface of the structure.

9. Low Temperature Impact Property

The center portion of the laminated structure was cut down to a size of 100 mm (longitudinal)×100 mm (lateral) to prepare a test piece having the same thickness as the laminated structure. The test piece was allowed to stand at a thermostatically controlled temperature of −10° C. for 5 hours and thereafter fixed to a holder having an opening portion of 50 mm diameter set up in the thermostatically controlled environment. Using the high rate impact tester RIT-8000 manufactured by Rheometrics, INC., the test piece was punched from the side of the laminated film with a dart of ⅝ inch tip diameter at a definite speed of 3 m/s. Then, a relationship between the load measured with a load cell set up to a dart and a dart displacement, and the broken surface of the test piece were found to determine the state of a fracture 10. Surface Glossiness 60° specular glossiness of the surface of the laminated structure (the surface at the laminated film side) was measured by the method prescribed in JIS-K-7105.

11. Wetting Degree wetting degree of the surface of the laminated film, which is to be printed, i.e. the surface to be laminated with the substrate, was measured by the method prescribed in JIS-K-6768

12. Haze

Haze of the laminated film was measured by the method prescribed in JIS-K-7105.

13. Deep Appearance

The surface of the laminated structure (the surface at the laminated film side) was visually evaluated depending on the following sensuous criteria.

5: a deep appearance was observed that was similar to that of a surface of a conventional injection molded product which had been treated by a metallic painting, followed by a clear coating.

4: a sufficiently deep appearance was observed, but was slightly inferior to "5".

3: a deep appearance was observed with certainty.

2: a deep appearance inferior to "3", but not so much that "no deep appearance" was observed.

1: absolutely no deep appearance was observed.

14. Adhesion Strength

The surface of the laminated structure (the surface at the laminated film side) was cross cut into a 2 mm×2 mm square using a razor blade to form 100 squares (10 squares in longitudinal direction×10 squares in lateral direction), and a 24 mm wide plastic adhesive tape (Cello-Tape, a trademark of Nichiban Co., Ltd.) was pressed over the cross cut surface under the finger-pressure and then peeled off in a stroke from the one end of the tape held with fingers. The squares remaining on the surface was counted to determine the adhesion strength between the laminated film and the substrate in terms of residual %. The measurement was conducted at the position close by the gate (1), as shown in FIG. 1, which position was considered to be lowest in the adhesive strength.

EXAMPLE 1

Production of Laminated Film

Using a propylene homopolymer in a pellet form (MFR= 2.3 g/10 min., melting point=160° C., CXS=2.3% by weight, modulus of elasticity in bending at 23° C.=1600 MPa) and a propylene based block copolymer in a pellet form, EXCELLEN EPX-KS37G1 (a trademark of Sumitomo Chemical Co., LTD., a pellet having MFR of 2.5 g/10 min. produced by decomposing a propylene based block copolymer in a powder form with a peroxide) as the propylene based resin and the propylene based block copolymer, respectively, a two-layer laminated film was produced with a co-extrusion T die film molding machine manufactured by Modern Machinery.

With respect to the above-mentioned propylene based block copolymer, a polymerization ratio of the propylene-ethylene copolymer component obtained in Step(I) (the component(A)) to the propylene-ethylene copolymer component obtained in Step(II) (the component(B)) was 51.6/48.4 (by weight), and the ethylene unit content in the component(A), EA, and the ethylene unit content in the component(B), EB, were 3.6% by weight and 15.2% by weight, respectively. Therefore, the ethylene unit content difference(EB−EA) was 11.6% by weight.

With respect to the above-mentioned propylene based block copolymer in a powder form, the intrinsic viscosity of the component(A), [η]A, was 3.03 dl/g, and the intrinsic viscosity of the component(B), [η]B, was 3.96 dl/g, and therefore the intrinsic viscosity ratio,[η]B/[η]A, was 1.31.

Using two extruders, an extruder of 50 mm diameter and an extruder of 40 mm diameter, the pellet of the propylene based resin mentioned above was melt-kneaded at 240° C. in the extruder of 50 mm diameter, and the resulting molten product was led to a chill roll surface through a feed block. On the other hand, the pellet of the propylene based block copolymer mentioned above was melt-kneaded at 240° C. in the extruder of 40 mm diameter, and the resulting molten product was led to an opposite chill roll surface through the feed block. Then, these molten products were extruded through a 600 mm wide co-extrusion T die kept at 250° C., and the extrudate was cooled through a chill roll kept at 20° C., in which the extrudate was brought into close contact with the chill roll surface, thereby obtaining a two-layer laminated film. In the above, a line speed was 4 m/min. A cross section of the resulting laminated film was observed with a 400 fold phase contrast microscope to show a total thickness of the film (thickness of the laminated film), an outer layer thickness of the film (thickness of the propylene based resin layer) and an inner layer thickness of the film (thickness of the propylene based block copolymer layer) The results were as shown in Table 1.

The laminated film obtained was subjected to heat-aging treatment in an oven kept at 90° C. for 3 hours, thereby obtaining a desired two-layer laminated film.

Production of Laminated Structure

As the olefinic resin constituting the substrate for the laminated structure, a propylene-ethylene block copolymer containing 0.1 part by weight of a nucleating agent, aluminum p-t-butyl-benzoate, PTBBA-AL (a trademark of Shell Chemical Co.), was used.

The above propylene-ethylene block copolymer was 5.8 g/10 min. in MFR, and a 3 mm thick injection-molded product made of the said copolymer showed ductile fracture in a high rate impact test of a 3 m/sec. speed at −10° C. A polymerization ratio of a propylene homopolymer portion in the said copolymer (hereinafter referred to P portion) to an ethylene-propylene copolymer portion therein (hereinafter referred to EP portion), an intrinsic viscosity of the P portion, an ethylene unit content in the EP portion and an intrinsic viscosity of the EP portion were 71/29, 1.56 dl/g, 38% by weight and 3.05 dl/g, respectively.

The above laminated film obtained through the heat-aging was cut down into a specimen of 100 mm×250 mm in a size. The specimen was put in a mold cavity so as to face the surface of the propylene based resin layer in the specimen to an inner wall of the cavity and closely contact with each other, and after closing the mold, the olefinic resin mentioned above was injected on the specimen to obtain a desired laminated structure. The resulting laminated structure showed ductile fracture in a low temperature impact test of −10° C. Evaluation results in relation to the pencil hardness and the surface glossiness of the laminated structure were as shown in Table 1.

EXAMPLE 2

Example 1 was repeated, except that as the propylene based resin constituting the laminated structure, a propylene homopolymer, Sumitomo Noblen H501 N (a trademark of Sumitomo Chemical Co.), was used, the propylene homopolymer being 4.3 g/10 min in MFR, and 1800 Mpa inmodulus of elasticity inbending at 23° C., and containing a nucleating agent, ADK STAB NA-21 (a trademark of Asahi Denka Kogyo K. K., sodium 2,2-methylenebis(4,6-di-tert-butylphenyl)phosphate) in an amount of 0.2 part by weight based on 100 parts by weight of the propylene homopolymer, and film thickness was varied, thereby obtaining a laminated structure comprising the substrate and the heat aged two-layer laminated film. The resulting laminated structure showed ductile fracture in the low temperature impact test of −10° C. Results were as shown in Table 1.

EXAMPLE 3

Production of Film

The propylene homopolymer, Sumitomo Noblen H501 N(see Example 2) as the propylene based resin was molded in the following manner using a film molding machine manufactured by Sumitomo Heavy Industries, LTD., thereby obtaining a single layer film of 320 $\mu$m thickness.

The propylene homopolymer was melt-kneaded at 280° C. in an extruder of 65 mm diameter. Thereafter, the molten product was extruded through a T die kept at 280° C. to obtain an extrudate in a film form, which was then passed through two chill rolls kept at specular surface temperatures of 70° C. and 90° C., respectively, (a distance between the two rolls: 300 $\mu$m), while closely contacting the extrudate with the rolls. Successively, the film cooled was drawn up by a drawing apparatus, and one side surface of the film was subjected to corona discharge treatment with an apparatus for the corona discharge treatment, which was connected to the drawing apparatus. A wetting degree of the corona discharge-treated surface of the film was found to be 50 dyne/cm, and a haze value thereof was found to be 6.7%.

After applying a print on the corona discharge-treated surface, the resulting film was heat-aged in an oven of 90° C. for 3 hours.

Production of Laminated Structure

The above film heat-aged was cut down to prepare a specimen of 150 mm×300 mm in a size, and the specimen was fixed to a mold so as to face the non-printed surface thereof to an inner wall of a moving side of the mold. After closing the mold, the same propylene-ethylene block copolymer as that used for preparation of the substrate in Example 1 was injected thereto to obtain a laminated structure. The resulting laminated structure exhibited a superior deep appearance rated as "4" in the sensuous evaluation. The results were as shown in Table 1.

COMPARATIVE EXAMPLE 1

In a manner similar to that of Example 1, the same propylene-ethylene block copolymer as that used for preparation of the substrate in Example 1 was injected in a mold, wherein neither film nor laminated film was placed, thereby obtaining a structure(i.e. substrate). The resulting structure showed ductile fracture in the low temperature impact test of −10° C. The evaluation results of the structure were also shown in Table 1.

TABLE 1

|  | Example 1 | Example 2 | Example 3 | Comparative Example 1 |
| --- | --- | --- | --- | --- |
| Total thickness of film ($\mu$m) | 110 | 352 | 320 | — |
| Outer layer thickness of film ($\mu$m) | 80 | 196 | — | — |
| Inner layer thickness of film ($\mu$m) | 30 | 156 | — | — |
| Adhesion strength (%) | 100 | 100 | 100 | — |
| Pencil hardness | 3B | B | B | 6B |
| Surface glossiness (%) | 70 | 70 | 91 | 64 |

What is claimed is:

1. A laminated film (LF-1) comprising:
(i) a layer containing a propylene resin having a modulus of elasticity in bending at 23°C. of from about 1300 to 2800 Mpa; and
(ii) a layer containing a propylene block copolymer having (A) and (B) components; wherein the propylene block copolymer is prepared by a process comprising the steps of:
(I) carrying out copolymerization of propylene with ethylene until the content of the component(A) reaches from about 40 to 85% by weight based on the total weight of the component(A) and the component (B) defined below, said component(A) being a propylene-ethylene copolymer component having an ethylene content (EA) of from about 1.5 to 6.0% by weight:
(II) carrying out copolymerization of propylene with ethylene in the presence of the component(A) prepared in step (I) until the content of the component (B) reaches from about 15 to 60% by weight based on the total weight of the components (A) and (B), said component(B) being a propylene-ethylene copolymer component having an ethylene content (EB) of from about 7 to 17% by weight;

provided that the intrinsic viscosity, (η)B, of the component (B) is from about 2 to 5 dl/g, and the ratio of (η)B to the intrinsic viscosity, (η)A, of the component(A), namely, (η)B/(η)A, is from about 0.5 to 1.8; and further provided that said propylene resin excludes a propylene block copolymer which has a modulus of elasticity in bending at 23° C. of not lower than about 1300 Mpa.

2. The laminated film according to claim 1, wherein the difference between the said content (EB) of the repeating unit derived from ethylene in the component(B) and the said content (EA) of the repeating unit derived from ethylene in the component(A), expressed as (EB)–(EA), is from about 3 to 15% by weight.

3. The laminated film according to claim 1, wherein the thickness of the layer containing the propylene resin is from about 50 to 400 μm, and the thickness of the laminated film is from about 60 to 500 μm.

4. A laminated film (LF-2) obtained by heat-aging the laminated film (LF-1) made according to claim 1.

5. A laminated structure (LS-2) comprising:
(a) a substrate containing an olefinic resin; and
(b) a laminated film (LF-1) according to claim 1,
wherein the substrate and the laminated film (LF-1) are laminated together, so that the film (LF-1) layer containing the propylene block copolymer contacts a surface of the substrate.

6. The laminated structure according to claim 5, wherein the olefinic resin comprises a propylene resin.

7. The laminated structure according to claim 5, wherein the pencil hardness of the surface of the laminated film in the laminated structure is 4B or more, and the low temperature impact property of the laminated structure is at least equal to that of the substrate per se in the laminated structure.

8. The laminated structure (LS-3) obtained by heat-aging the laminated structure (LS-2) according to claim 5.

9. A laminated structure (LS-4) comprising:
(a) a substrate containing an olefinic resin; and
(b) a laminated film (LF-2) according to claim 4,
wherein the substrate and the laminated film (LF-2) are laminated together.

10. An interior or exterior car part or a casing part of electric or OA (office automation) appliance, comprising a laminated structure (LS-2) according to claim 5.

11. An interior or exterior car part or a casing part of an electric or OA (office automation) appliance comprising a laminated structure (LS-3) according to claim 8.

12. An interior or exterior car part or a casing part of an electric or OA (office automation) appliance, comprising a laminated structure (LS-4) according to claim 9.

* * * * *